(12) United States Patent
Massey et al.

(10) Patent No.: US 6,643,880 B1
(45) Date of Patent: Nov. 11, 2003

(54) DOCK LEVELER

(75) Inventors: Douglas H. Massey, New Berlin, WI (US); Kim Duvernell, Brown Deer, WI (US)

(73) Assignee: Kelley Company, Inc., Milwaukee, WI (US)

( * ) Notice: Subject to any disclaimer, the term of this patent is extended or adjusted under 35 U.S.C. 154(b) by 0 days.

(21) Appl. No.: 09/704,056

(22) Filed: Nov. 1, 2000

Related U.S. Application Data

(60) Provisional application No. 60/162,691, filed on Nov. 1, 1999.

(51) Int. Cl.[7] .................................................. B65G 69/28
(52) U.S. Cl. .......................................... 14/71.3; 14/69.5
(58) Field of Search ................................ 14/69.5, 71.3, 14/71.1

(56) References Cited

U.S. PATENT DOCUMENTS

| | | | |
|---|---|---|---|
| 3,117,332 A | | 1/1964 | Kelley et al. |
| 3,656,199 A | * | 4/1972 | Bregantini ..................... 14/71 |
| 3,902,213 A | | 9/1975 | Pfleger et al. |
| 3,967,337 A | | 7/1976 | Artzberger |
| 4,012,804 A | | 3/1977 | Catlett |
| 4,014,059 A | | 3/1977 | Artzberger et al. |
| 4,068,338 A | | 1/1978 | Artzberger |
| 4,081,874 A | | 4/1978 | Artzberger |
| 4,091,488 A | | 5/1978 | Artzberger |
| 4,110,860 A | | 9/1978 | Neff et al. |
| 4,365,374 A | | 12/1982 | Bennett |
| 4,398,315 A | | 8/1983 | Driear et al. |
| 4,402,100 A | | 9/1983 | Slusar |
| 4,420,849 A | * | 12/1983 | Alten .......................... 14/71.3 |
| 4,531,248 A | | 7/1985 | Swessel et al. |
| 4,570,277 A | | 2/1986 | Hahn et al. |
| 4,776,052 A | | 10/1988 | Delgado et al. |
| 4,922,568 A | | 5/1990 | Hageman |
| 4,955,923 A | | 9/1990 | Hageman |
| 5,042,103 A | | 8/1991 | Megens |
| 5,205,010 A | | 4/1993 | Hageman |
| 5,274,867 A | | 1/1994 | Hageman |
| 5,392,481 A | | 2/1995 | Hageman |
| 5,416,941 A | | 5/1995 | Hageman |
| 5,446,938 A | | 9/1995 | Warner et al. |
| 5,450,643 A | | 9/1995 | Warner |
| 5,457,838 A | * | 10/1995 | Gelder et al. ................. 14/69.5 |
| 5,471,693 A | | 12/1995 | Hodges |
| 5,475,888 A | | 12/1995 | Massey |
| 5,481,774 A | | 1/1996 | Hodges et al. |
| 5,500,968 A | | 3/1996 | Hodges |
| 5,522,107 A | | 6/1996 | Hageman et al. |
| 5,522,108 A | | 6/1996 | Massey et al. |
| 5,600,859 A | | 2/1997 | Hodges et al. |
| 5,621,938 A | | 4/1997 | Warner |
| 5,651,155 A | | 7/1997 | Hodges et al. |
| 5,802,650 A | | 9/1998 | Masey et al. |
| 5,802,651 A | | 9/1998 | Massey et al. |
| 5,996,156 A | * | 12/1999 | Massey ....................... 14/71.3 |

* cited by examiner

*Primary Examiner*—Thomas B. Will
*Assistant Examiner*—Raymond Addie
(74) *Attorney, Agent, or Firm*—Baker & Hostetler, L.L.P

(57) ABSTRACT

A dock leveler including a ramp having a rear edge movably interconnected with a loading dock, an intermediate member movable relative to the ramp, and an inflatable assembly positioned to cause relative movement between the ramp and the intermediate member upon inflation of the inflatable assembly, thereby resulting in movement of the ramp. The intermediate member is movably mounted to a pit floor, a support structure, or the ramp. A roller member is mounted to an end of the intermediate member. The inflatable assembly can be operatively associated with a vacuum device to allow for selective removal of gas from the inflatable assembly. Alternatively, a hydraulic assembly and a support frame may replace the inflatable assembly and intermediate member. The dock leveler includes hook-type bracket members and mounting bores to accommodate either powering arrangement.

20 Claims, 6 Drawing Sheets

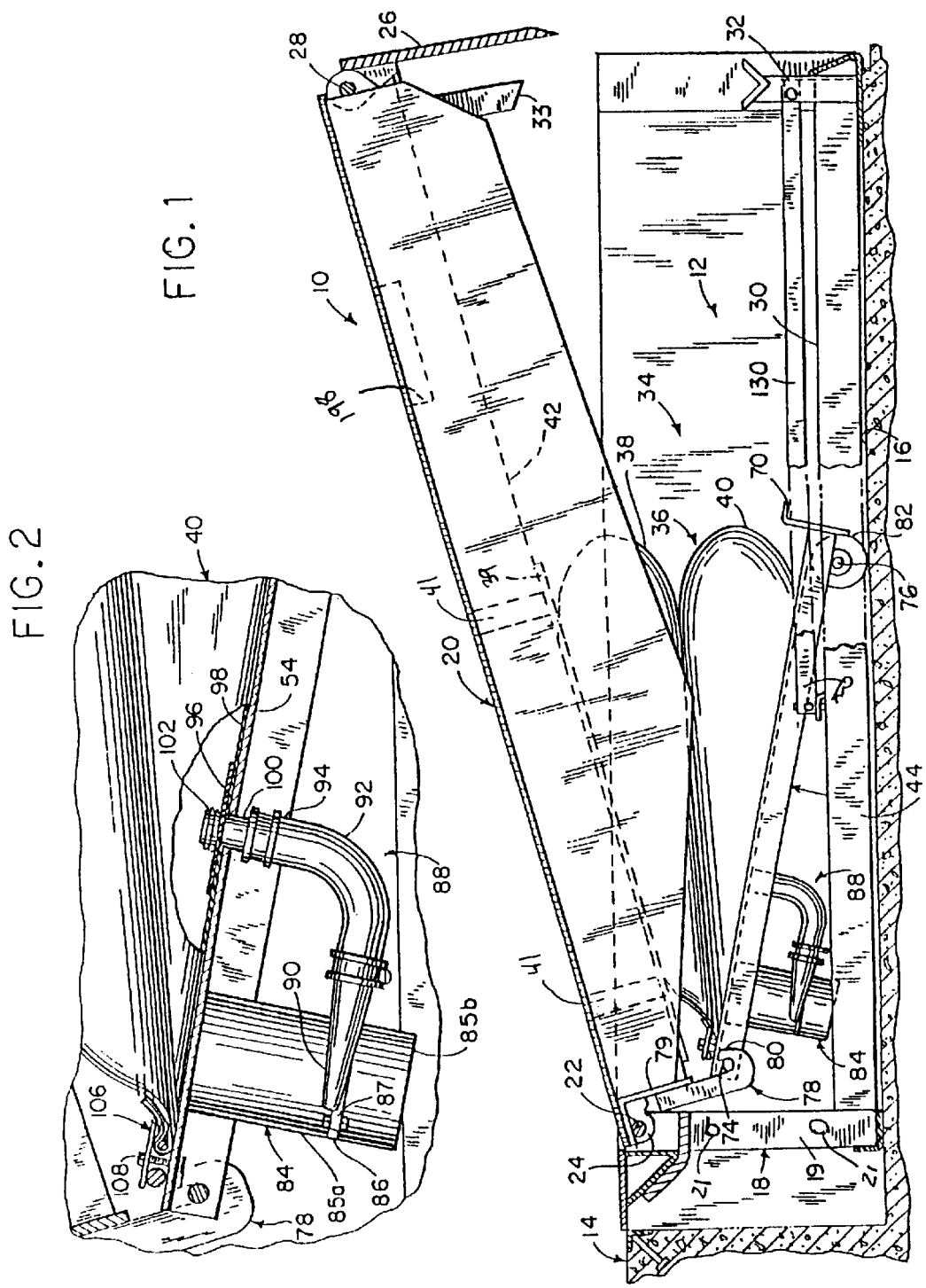

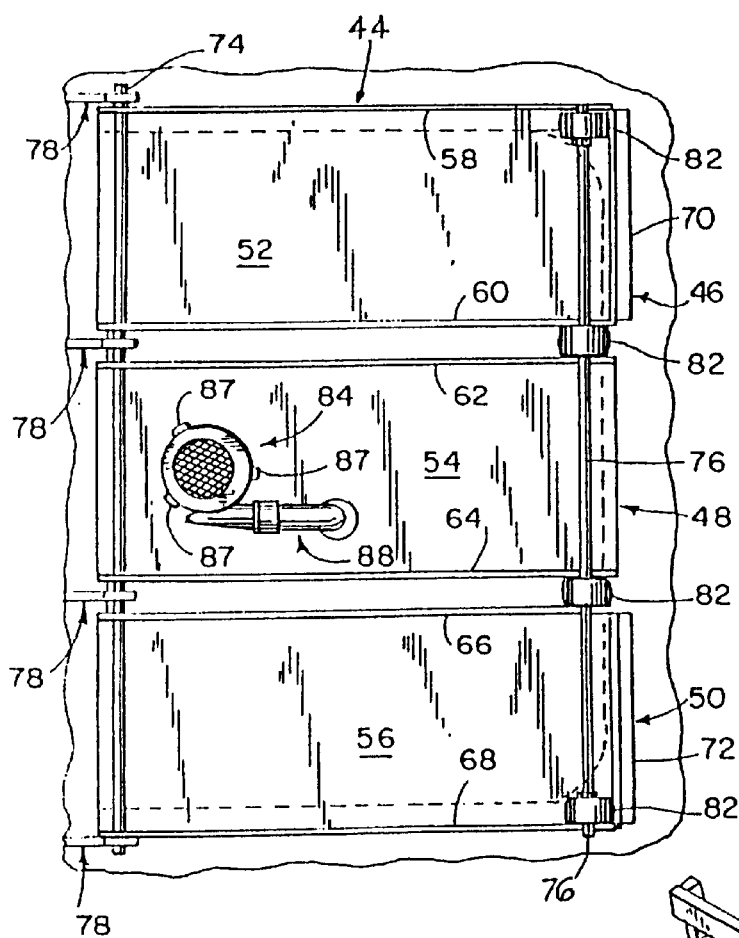
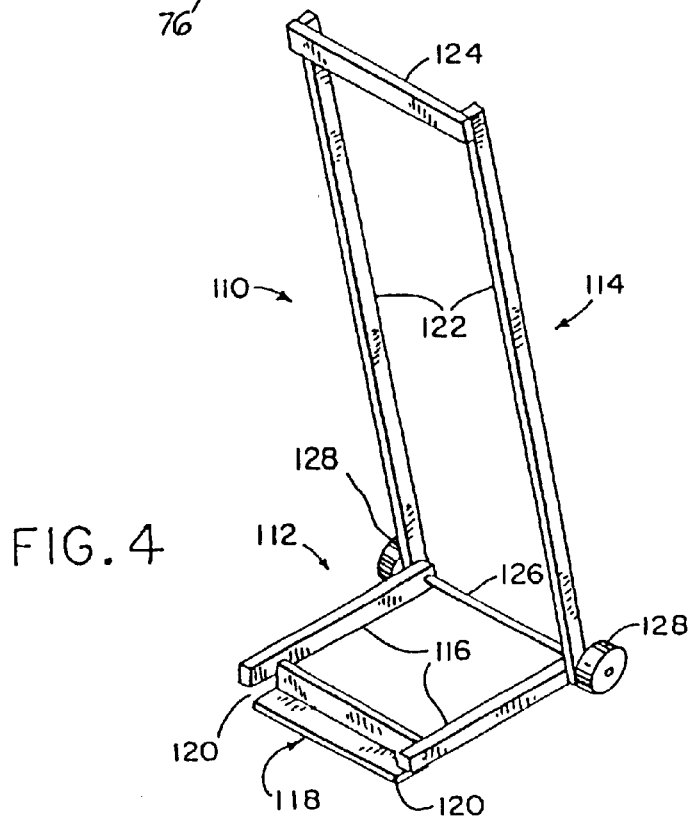

US 6,643,880 B1

DOCK LEVELER

RELATED APPLICATIONS

This application claims the benefit under 35 U.S.C. §119 of U.S. Provisional Application No. 60/162,691, entitled DOCK LEVELER, filed on Nov. 1, 1999.

BACKGROUND OF THE INVENTION

This invention relates to a dock leveler used to bridge the gap between a loading dock and the bed of a truck or carrier parked adjacent the loading dock, and more particularly to improvements in dock levelers incorporating an airbag or other inflatable member for raising the ramp of the dock leveler.

A dock leveler typically includes a frame or supporting structure mounted in a pit or depression in the loading dock. The rear end of a ramp or deck plate is pivotally mounted to the supporting structure so that the ramp is movable from a horizontal position to a position within the working range of the ramp (e.g., between an upwardly inclined position and a downwardly declined position). An extension lip is pivotably mounted to the forward end of the ramp, and is movable between a downwardly hanging pendant position and an extended position in which the lip forms an extension to the ramp.

After a truck has parked in front of the loading dock in preparation for a loading or unloading operation, the ramp of the dock leveler is raised to its upwardly inclined position. The lip is then pivoted outwardly to its extended position. As the ramp is lowered, the lip engages the bed of the truck to support the ramp, such that the ramp and the lip in combination bridge the gap between the loading dock and the truck bed. After the loading or unloading operation is completed, the ramp is raised and the lip falls by gravity to its pendant position. The ramp is then lowered to its horizontal position, and the truck can then pull away from the loading dock.

In the past, the ramp has been pivoted to its upward position in response to operation of a mechanical or hydraulic mechanism. However, recent developments in the dock leveler art disclose an inflatable member or bag utilized to pivot the ramp to its upwardly inclined position, such as is illustrated in U.S. Pat. No. 5,802,650. This patent discloses a bag inflated with low-pressure air by an inflating device such as a fan or blower, and is hereby incorporated by reference in its entirety.

Dock leveler users have different preferences as to size and power units for their dock levelers, necessitating a dock leveler distributor to carry a wide variety of stock items to match a large number of combinations.

SUMMARY OF THE INVENTION

The present invention relates to improvements to the above-noted dock levelers incorporating an inflatable member. In one aspect, the dock leveler of the present invention is adapted to be mounted to a loading dock having an upper dock surface and a pit disposed in the upper surface. The dock leveler includes a supporting structure positionable within the pit, the pit having a floor, the supporting structure including at least two vertical members, each vertical member having therethrough at least one horizontally-oriented bore. The dock leveler also includes a ramp having a rear edge movably interconnected with the supporting structure at a pivot point; at least two hook-type bracket members affixed to the rear edge of the ramp; and a power unit positioned to cause relative movement between the ramp and the pit floor upon operation of the power unit, thereby resulting in movement of the ramp relative to the supporting structure.

In one embodiment, the power unit is an inflatable assembly and can include an intermediate member pivotably mounted to the hook-type bracket members. The intermediate member includes a roller member mounted to an end of the intermediate member. In another embodiment, the inflatable assembly includes a blower device operatively connected to the inflatable assembly. In yet another embodiment, the power unit is a hydraulic assembly having a hydraulic cylinder and can include a support frame removably mounted to the at least two vertical members using attachment devices in the bores. The support frame can be affixed to the pit floor, and the hydraulic cylinder can be pivotably attached to the support frame and to the ramp. Finally, the hydraulic assembly can include a hydraulic pump operatively connected to the hydraulic cylinder.

In yet another embodiment, the dock leveler includes structure to accommodate both hydraulic and pneumatic power units, allowing the same dock leveler structure to be used with either power unit, thus reducing the number of stock keeping units that need to be manufactured and carried.

BRIEF DESCRIPTION OF THE DRAWINGS

FIG. 1 is a longitudinal section view of a dock leveler constructed according to the invention, illustrating the ramp in its upwardly inclined raised position.

FIG. 2 is a partial section view of the dock leveler of FIG. 1, with portions broken away, showing a portion of the inflatable member, the support and the inflating device subassembly.

FIG. 3 is a bottom plan view of the subassembly illustrated in FIG. 2.

FIG. 4 is an isometric view of a lifting tool for raising the forward end of the lifting device support above the supporting surface to a raised position.

DETAILED DESCRIPTION OF THE PREFERRED EMBODIMENT

Figure 5:
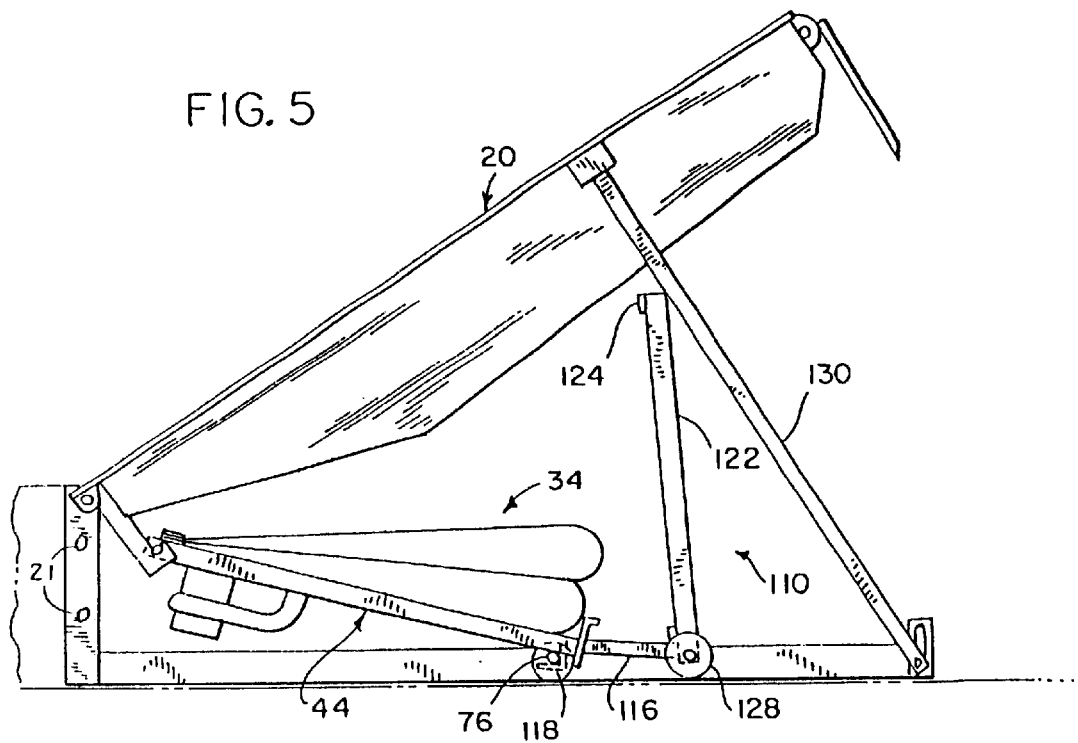
FIG. 5 is a schematic view of the dock leveler of FIG. 1 showing the lifting tool of FIG. 4 in an engaged, inoperative position.

Referring to FIG. 1, a dock leveler 10 is mounted in a pit or depression 12 in a loading dock 14. The lower surface or floor 16 of pit 12 preferably slopes downwardly and forwardly. Dock leveler 10 is adapted to bridge the gap between the upper surface of loading dock 14 and the bed of a truck or carrier parked in front of loading dock 14, to facilitate loading or unloading of the truck or carrier.

Dock leveler 10 includes a frame or supporting structure 18, which is mounted in pit 12, and the rear end of a ramp or deck plate 20 is pivotably mounted to the upper end of frame 18 via one or more pins 22, again in a conventional manner. Ramp 20 is movable between a generally horizontal stored, dock-level position, in which ramp 20 is flush and substantially co-planar with the upper surface of dock 14, and an upwardly inclined position, as shown in FIG. 1.

Figure 9:
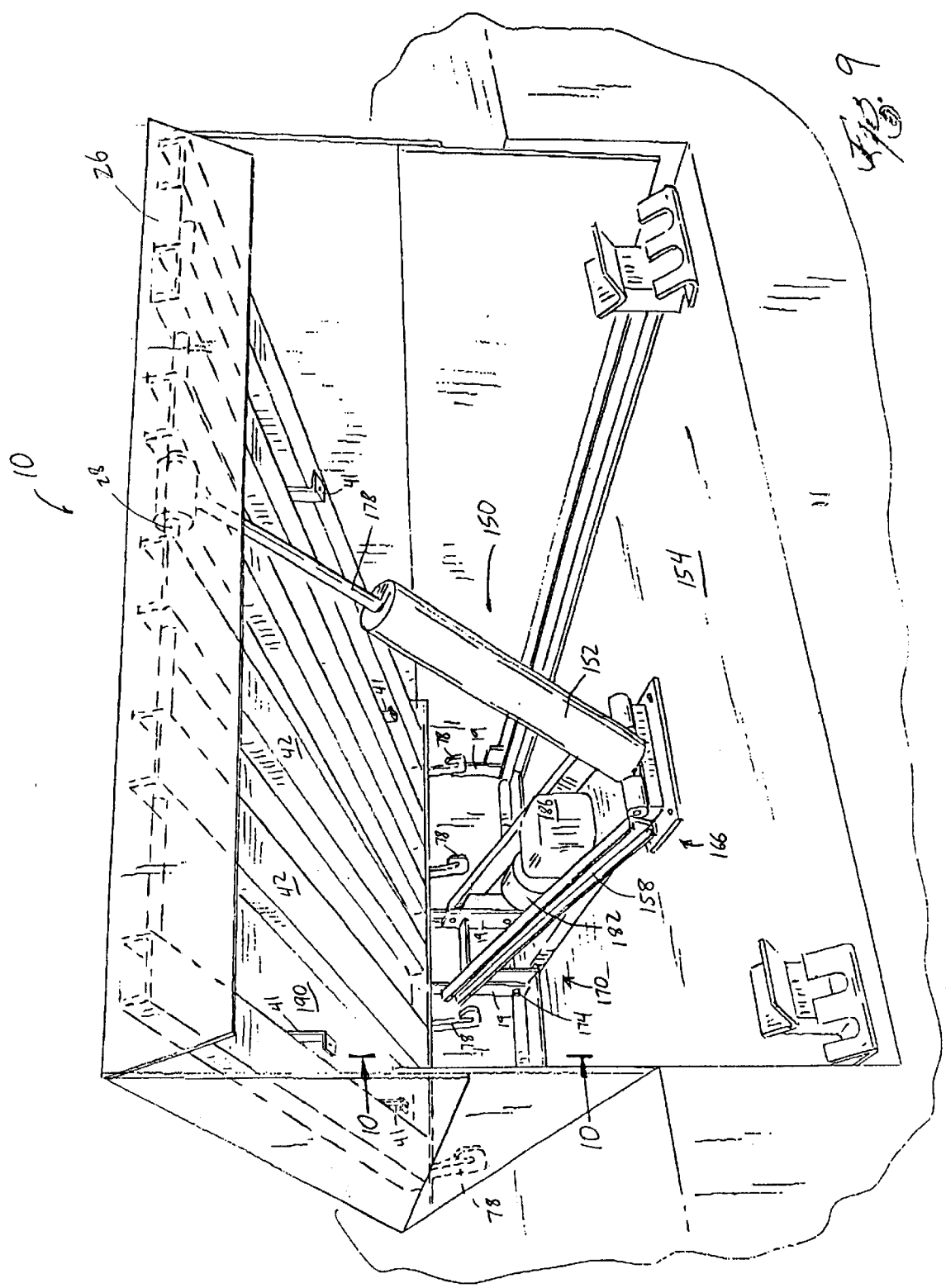
FIG. 9 is a perspective view of alternative embodiment of the dock leveler of FIG. 1 illustrating a hydraulic power unit with the present invention.
Figure 10:
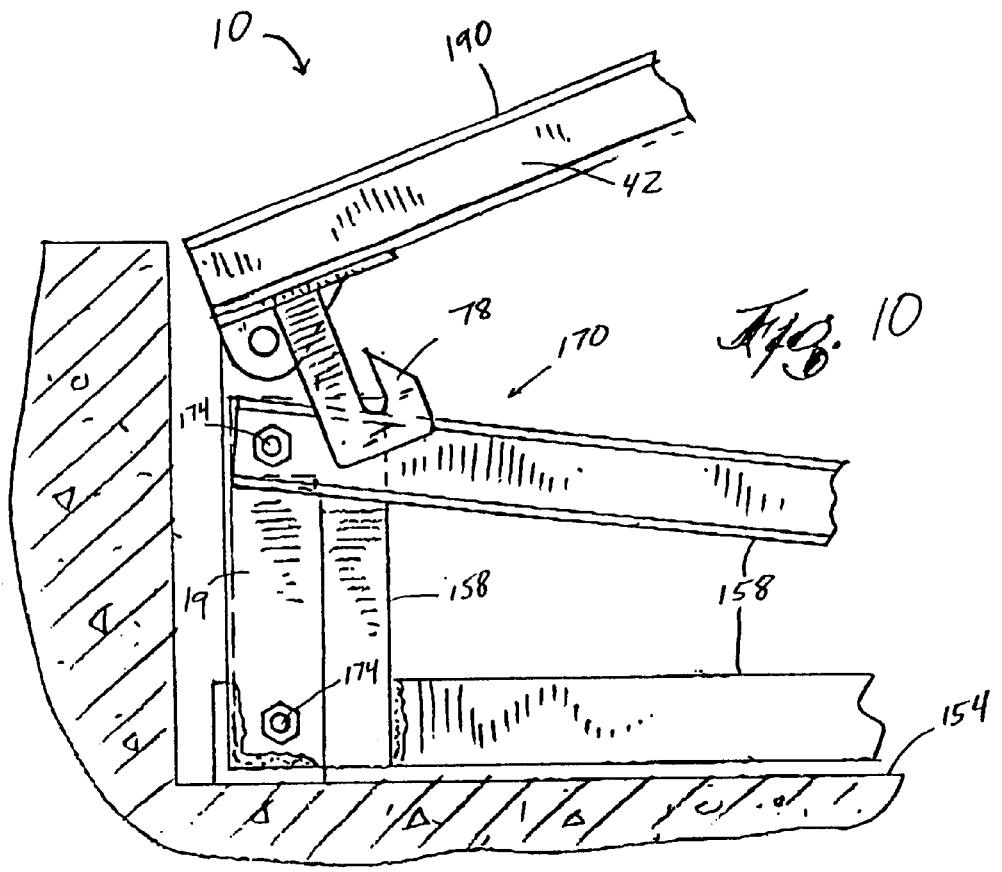
FIG. 10 is a partial section view taken along line 10—10 of FIG. 9.

To pivotably mount ramp 20 to frame 18, a series of lugs 24, interconnected with ramp 20, are mounted to the upper ends of vertical members 19 of frame 18 through pins 22. Each vertical member 19 includes two horizontal bores 21 therethrough. The bores 21 are provided, although not employed in this embodiment, to accommodate an alternative embodiment as described below and as illustrated in FIGS. 9 and 10.

An extension lip 26 is hinged to the forward end of ramp 20 by means of hinge pins 28. Extension lip 26 is pivotable from a downwardly hanging pendant position, as illustrated in FIG. 1, to an outwardly extending position (not shown), via a conventional lip extension mechanism which is actuated when ramp 20 is moved from its raised position to a lowered position. When lip 26 is moved to its outwardly extending position, lip 26 is generally co-planar with ramp 20, forming an extension to ramp 20. Lip 26 can be moved from its pendant position to its extended position and held in its extended position by various mechanical, hydraulic or pneumatic mechanisms, in a manner as is known, and the lip lifting and latching mechanism is not, in itself, a part of the present invention.

Frame 18 further includes a pair of spaced, forwardly-extending side members 30 located adjacent the sides of pit 12, and a pair of front support pads 32 mounted to the forward ends of side members 30. The support pads 32 are designed to support dock level supports 33. Side members 30 are preferably in the form of angle members, each defining an outer vertical section and lower horizontal sections spaced slightly above pit floor 16. A lifting subassembly, shown generally at 34, is located in pit 12 beneath ramp 20. Lifting subassembly 34 consists of an inflatable member or bag assembly 36 including vertically superimposed upper and lower bags 38, 40, respectively. The construction of bag assembly 36 is illustrated and described in U.S. Pat. No. 5,446,938, which is hereby incorporated by reference in its entirety. The bags 38, 40 are preferably formed of any satisfactory air-impervious material, such as fabric coated with a thermoplastic resin, and have contiguous horizontal surfaces joined together via an annular seal enclosing an opening providing communication between bags 38, 40. It should be appreciated that one or more bags could be used.

The upper surface of bag assembly 36, defined by the upper extent of upper bag 38, bears against a pressure plate 39 mounted to the underside of the deck plate 20 by a series of C-shaped pressure plate brackets 41. The pressure plate brackets 41 are welded to the underside of the deck plate 20, and the pressure plate 39 is riveted to the pressure plate brackets 41. A deck bracket 198 is also welded to the underside of the deck plate 20, as is described in more detail below.

Bag assembly 36 is mounted to a bag support assembly 44 (FIGS. 1 and 3), which as shown consists of three side-by-side sections 46, 48 and 50 (FIG. 3). Sections 46, 48 and 50 include upper support plates 52, 54 and 56, respectively, which have downturned side flanges 58, 60; 62, 64; and 66, 68, respectively. Front bumpers 70, 72, in the form of inverted L-shaped sections, are mounted to the forward ends of support sections 46 and 50.

A pin 74 extends through aligned openings located adjacent the rearward ends of flanges 58–68, and an axle 76 extends through aligned openings located toward the forward ends of flanges 58–68. Pin 74 and axle 76 function to secure support sections 46, 48 and 50 together.

Referring to FIGS. 1–3, pin 74 is removably engageable within upwardly facing slots formed in depending hook-type bracket members 78 mounted to a rear transverse angle member 79 located at the rearward ends of beams 42 below ramp 20. Each bracket member 78 includes an upwardly extending lip 80 at its lower, forward end defining the slot within which pin 74 is received. With this construction, the rearward end of support 44 is removable from engagement with brackets 78 via an upward movement of the rearward end of support 44.

A series of wheels 82 are mounted to axle 76. An outer pair of wheels are located adjacent flanges 58 and 68, and an inner pair of wheels 82 are located one between sections 46 and 48 adjacent flanges 60 and 62, respectively, and the other between sections 48 and 50 adjacent flanges 64 and 66, respectively. The wheels 82 are engageable with pit floor 16 so as to enable rolling movement of support 44 thereon. As shown in FIG. 1, when wheels 82 are engaged with pit floor 16 and when pin 74 is mounted within the slots in brackets 78, the rearward end of support 44 is elevated relative to the forward end. It should be appreciated that one or more wheels could be used.

A fan or blower assembly 84 is mounted to the lower surface of one of the plates, preferably to plate 54 of central section 48. Fan assembly 84 consists of an upper housing 85a and a lower housing 85b (FIG. 2). A fan unit including a mounting ring 86 having a series of bosses 87 is secured between upper housing 85a and lower housing 85b, with the fan itself being disposed within upper housing 85a and its inlet and a filter being disposed within lower housing 85b. Fan assembly 84 is electrically operated, and includes a conventional cord engageable with an electrical outlet (not shown) for providing power to fan assembly 84.

As shown in FIG. 2, an air pipe assembly 88, consisting of a fan outlet section 90 formed integrally with ring 86, a flexible elbow 92 and a discharge section 94, is mounted between the fan assembly 84 and the interior of lower airbag 40. Fan outlet section 90 receives pressurized air from fan assembly 84, which is then transferred through elbow 92 and discharge section 94 into lower airbag 40 and subsequently into upper airbag 38.

While fan assembly 84 is shown mounted to support 44, it is understood that fan 84 could be mounted in any other location, such as between beams 42. Alternatively, it is understood that air from a pressurized, regulated air source, such as compressed shop air, could be used in place of fan assembly 84.

Referring to FIG. 2, a flexible elastomeric reinforcing ring 96 is secured, such as by heat sealing or gluing, to the lower wall 98 of lower airbag 40, and ring 96 includes a central opening overlying the inlet opening formed in airbag lower wall 98. A nipple 100 having barbs 102 is connected to the end of discharge section 94 and extends through the aligned openings formed in plate 54, bag lower wall 98 and ring 96. Barbs 102 are engageable with reinforcing ring 96 so as to securely mount bag assembly 34 to discharge pipe assembly 88.

Bag assembly 34 is secured to support sections 46,48,50 using a clamp bar 106 (FIG. 2), which is secured via bolts 108 and associated nuts to plates 52, 54 and 56, after bag reinforcing ring 96 is secured to nipple 100 using a downward push-on motion forcing ring 96 over the barbs 102 of the nipple 100.

With the construction as illustrated in FIGS. 1–3, lifting assembly 34, consisting of bag assembly 36, bag support 44 and fan assembly 84, is removable as a unit from dock leveler 10, to facilitate servicing and/or replacement of such components. This arrangement substantially simplifies construction of dock leveler 10 by enabling the airbag, support and fan subassembly to be assembled separately from the other components of dock leveler 10. Further, a very short run of piping is necessary to communicate pressurized air from fan assembly 84 to airbag assembly 36, which again simplifies manufacture and minimizes the mount of pressure loss through the piping.

A lifting tool 110 (FIG. 4) is adapted for use in raising the forward end of airbag support 44. Lifting tool 110 includes a lower lifting section 112 and a lever or lifting handle section 114. Lower lifting section 112 includes a pair of lifting members 116 and a forward mounting member 118 in the form of an angle section mounted between the forward ends of lifting members 116. The lower flange of forward mounting member 118 is disposed in a plane parallel to the plane of the lower surfaces defined by lifting members 116 and is spaced there below, so as to define a pair of slots 120. Lever section 114 includes a pair of tube handle sections 122 connected at their upper ends via a crossbar 124. The lower ends of tube handle sections 122 and the rearward ends of lifting members 116 are welded together. An axle 126 extends through aligned openings formed in tube handle sections 122 and lifting members 116, and wheels 128 are mounted to the ends of axle 126.

Lifting section 112 and lever section 114 cooperate to define an acute angle therebetween, preferably 70 degrees to 80 degrees.

Figure 6:
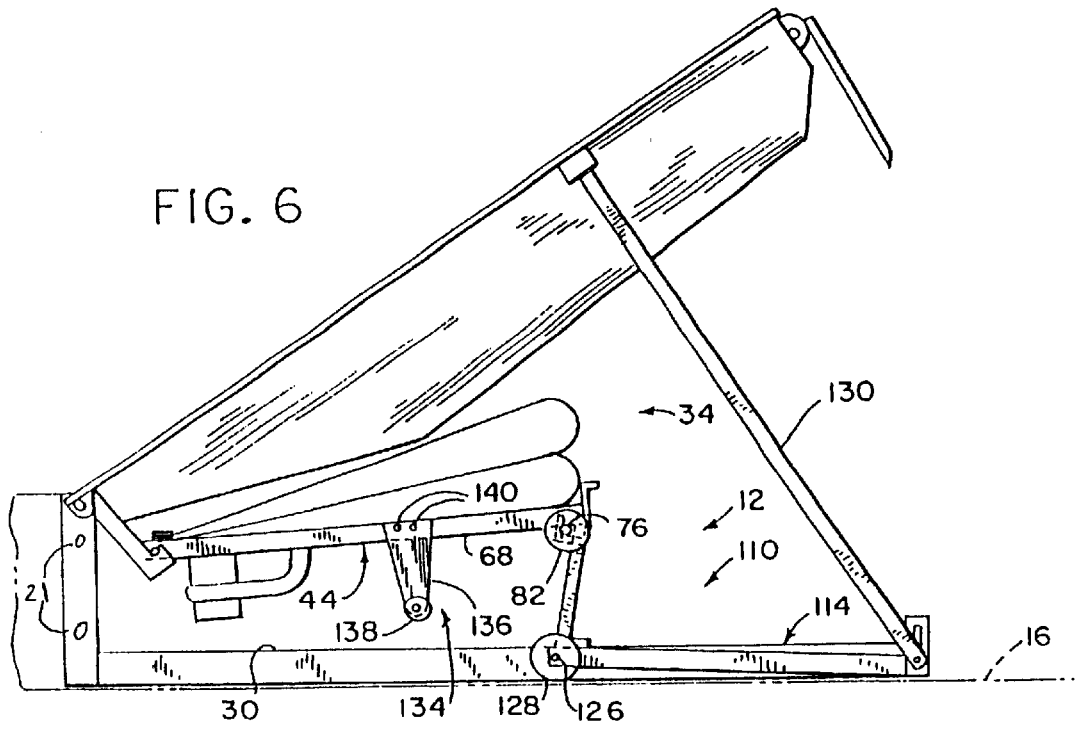
FIG. 6 is a view similar to FIG. 5, showing the lifting tool in its operative lifting position for raising the forward end of the lifting device support and showing mounting of the auxiliary wheels to the lifting device support.

Referring to FIGS. 5 and 6, lifting tool 110 is used to lift the forward end of airbag support 44 when the maintenance strut 130 of dock leveler 10 is in its operative position in which ramp 20 is raised upwardly to a maintenance position from its conventional at-rest position, in accordance with conventional operation of a maintenance strut of this type. Lifting tool 110 is moved to an engaged position in which axle 76 is received within slots 120, with the lower flange of angle 118 being located below axle 76 and the forward bottom edges of lifting members 116 being located over axle 76. While maintaining such engagement of lifting section 112 with axle 76, the user exerts a downward and rearward force on handle section 114 by grasping upper cross-bar 124 and bringing handle section 114 to its FIG. 6 position in which the upper end of handle section 114 engages pit floor 16. During such movement of handle section 114, wheels 128 roll rearwardly on pit floor 16 to the position as shown in FIG. 6, in which the axle 126, to which wheels 128 are mounted, is located rearwardly of axle 76. This movement results in lifting members 116 raising axle 76, and thereby the forward end of support 44, to a raised position as shown in FIG. 6.

The geometry of lifting tool 110, in which axle 76 is located forwardly of lifting tool axle 126 when lifting tool handle section 114 is engaged with pit floor 16, enables the operator to leave lifting tool 110 in its FIG. 6 position to maintain the front end of support 44 in its raised position. The weight of support 44, airbag assembly 34 and fan 84 exerts a downward force on wheels 128 and the forward end of handle section 114 to maintain lifting tool 110 in its operative lifting position, without assistance from the operator. The operator is then free to clean the rearward portion of pit 12 below support 44, such as by using a broom or by spraying water, or by another other satisfactory method. After use, lifting tool 110 is returned to its FIG. 5 position and removed for subsequent operation of dock leveler 10

Figure 8:
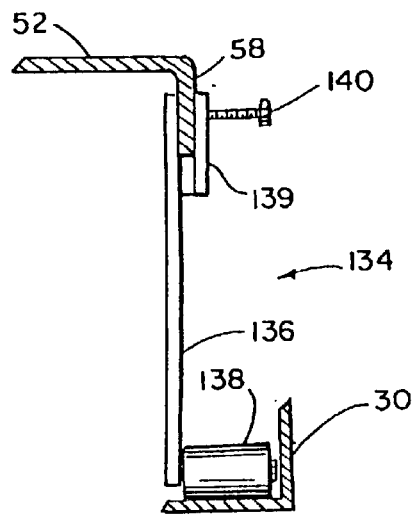
FIG. 8 is a partial section view taken along line 8—8 of FIG. 7.

Alternatively, while lifting tool 110 is in its operative lifting position of FIG. 6, and if the operator desires to remove support 44 for servicing of airbag assembly 34, fan assembly 84 or support 44, the operator mounts a pair of auxiliary wheel assemblies 134 to flanges 58 and 68. Each auxiliary wheel assembly 134 consists of a mounting plate 136 having a wheel 138 rotatably mounted to its lower end, and having an upper clamping plate 139 mounted to its upper end. Clamping plate 139 includes a threaded opening that receives the threaded shank of a bolt 140 (FIG. 8). Bolt 140 engages flange 58 of support 52 to clamp flange 58 between the end of bolt 140 and the upper end of mounting plate 136. In this manner, auxiliary wheel assemblies 134 are temporarily secured to flanges 58, 68.

Mounting plate 136 of each auxiliary wheel assembly 134 is constructed such that each auxiliary wheel 138 is located at an elevation below that of support wheels 82 when auxiliary wheel assemblies 134 are mounted to support 44. In this manner, when lifting tool 110 is moved from its operative lifting position of FIG. 6 back toward its engaging position of FIG. 5, auxiliary wheels 138 engage a rolling surface, which in this case is the lower flange of frame side members 30, and support wheels 82 are located above pit floor 16 and frame side members 30. Alternatively, it is understood that auxiliary wheels 138 may be constructed so as to engage pit floor 16.

Figure 7:
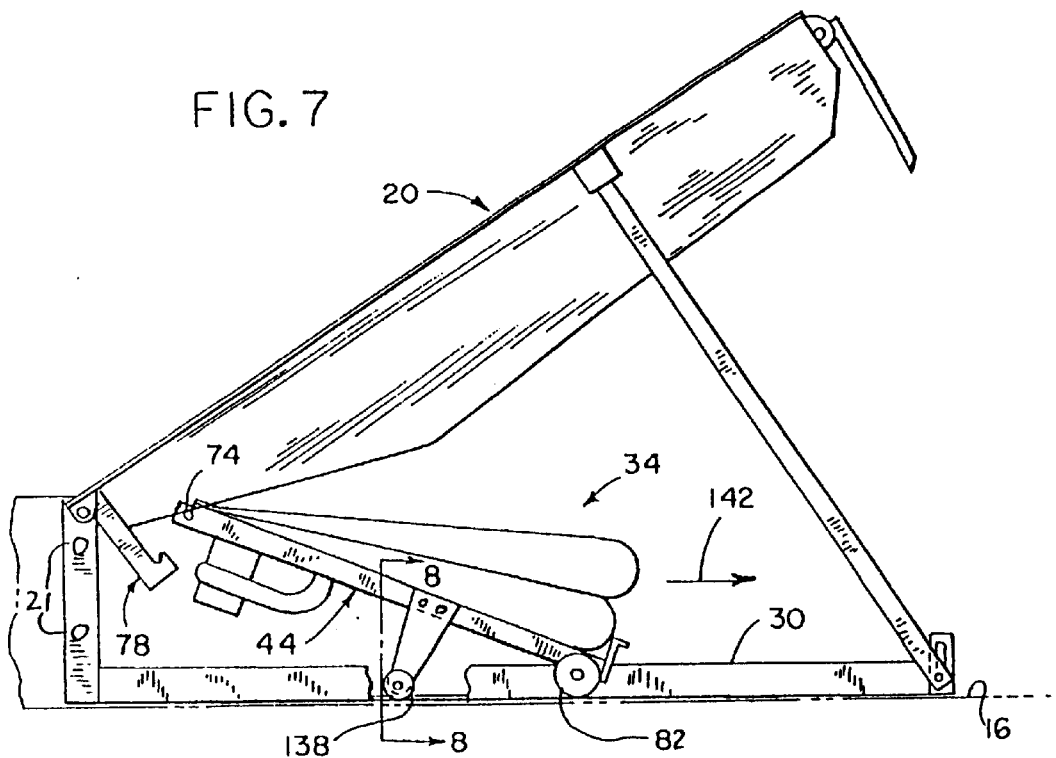
FIG. 7 is a view similar to FIGS. 5 and 6, showing removal of the lifting device support, the inflatable member and the inflating device using the auxiliary wheels mounted to the support.

The user then removes lifting tool 110, and exerts a downward force on the forward end of support 44 to pivot the rear end of support assembly 44 upwardly, as shown in FIG. 7, while maintaining engagement of auxiliary wheels 138 with frame side members 30. This downward movement of the forward end of support 44 and raising of the rearward end of support 44 disengages pin 74 from the slot in brackets 78. Engagement between dock leveler 10 and lifting subassembly 34 is then released, and the operator exerts a forward force in the direction of arrow 142 (FIG. 7) cause auxiliary wheels 138 to ride on frame side members 30 to withdraw subassembly 34 forwardly from below ramp 20. After the subassembly 34 has been serviced as required or if pit 12 has been serviced as necessary upon removal of subassembly 34, subassembly 34 is replaced by reversing the above steps. That is, subassembly 34 is moved rearwardly while maintaining auxiliary wheels 138 in engagement with frame side members 30, until pin 74 engages the forward surfaces of brackets 78. The operator then employs lifting tool 110 to raise the forward end of support 44 as shown in FIG. 6, wherein pin 74 rides on the forward surfaces of brackets 78 until pin 74 is received within the slot formed in brackets 78. While support 44 is in its raised position, auxiliary wheel assemblies 134 are removed from support 44, and lifting tool 110 is thereafter moved back to its FIG. 5 position and then withdrawn from below ramp 20. Ramp 20 is then once again moved to its raised position by operation of fan 84, and maintenance strut 130 is then replaced to its inoperative position as shown in FIG. 1. Dock leveler 10 is then again ready for operation.

It is understood that lifting tool 110 and auxiliary wheel assemblies 134 could be employed in connection with any type of lifting device support, and are not limited to use in connection with an airbag-type lifting arrangement. It is also understood that lifting tool 110 and auxiliary wheel assemblies 134 could be employed in an airbag-operated dock leveler in which fan 84 is in a location other than mounted to support 44.

FIGS. 9 and 10 illustrate an alternative embodiment of the dock leveler 10 illustrated in FIG. 1. In this embodiment, a hydraulic assembly 150 has replaced the airbag lifting subassembly 35 without the need for cutting or welding additional mounting locations.

As shown in FIG. 9, the hydraulic assembly includes a hydraulic cylinder 152 positioned within a support frame 158, which is positioned directly on the pit floor 154. The hydraulic cylinder 152 is pivotably attached to the proximal end 166 of the support frame 158. The proximal end 166 of the illustrated support frame 158 is removably anchored to the pit floor 154 using bolts. The distal end 170 of the support frame 158 is removably attached to the vertical members 19 using bolts 174 or other attachment devices in the bores 21 (see also FIG. 10). A hydraulic piston 178 moves within the hydraulic cylinder 152, and is pivotably attached to the lip hinge pins 28 at the center of the lip 26. A hydraulic pump 182 and a hydraulic fluid reservoir 186 are also mounted within the support frame 158. In operation, the hydraulic piston 178 is extended and retracted to pivot the deck plate 190 upward and downward, respectively. As used herein, "extend" and "retract" are relative terms and should not be interpreted as requiring that the hydraulic piston 178 be completely extended and completely withdrawn, respectively.

As shown in FIGS. 9 and 10, the hook-type bracket members 78 are provided, although not used in this embodiment, to make the dock leveler 10 identical to that illustrated in the previous embodiments. Pressure plate brackets 41 are mounted to the underside of the deck plate 190. A pressure plate and the pressure plate brackets 41 are also not used in this embodiment. Providing hook-type bracket members 78, bores 21, and pressure plate brackets 41 in every embodiment of a dock leveler allows for a reduction in the number of stock keeping units (SKUs) carried by the manufacturer and the distributors. Rather than carrying different dock levelers for different power units, the same dock leveler can be used whether the dock leveler has a pneumatic or a hydraulic power unit, because the same dock leveler is designed to accommodate either power unit. Because the dock levelers are identical except for the power unit, the dock leveler may be completely manufactured except for the power unit and stored for later sale. Likewise, a consumer who purchases a dock leveler with a hydraulic power unit can later convert to a pneumatic power unit in a simple process that involves no cutting or welding.

Figure 11:
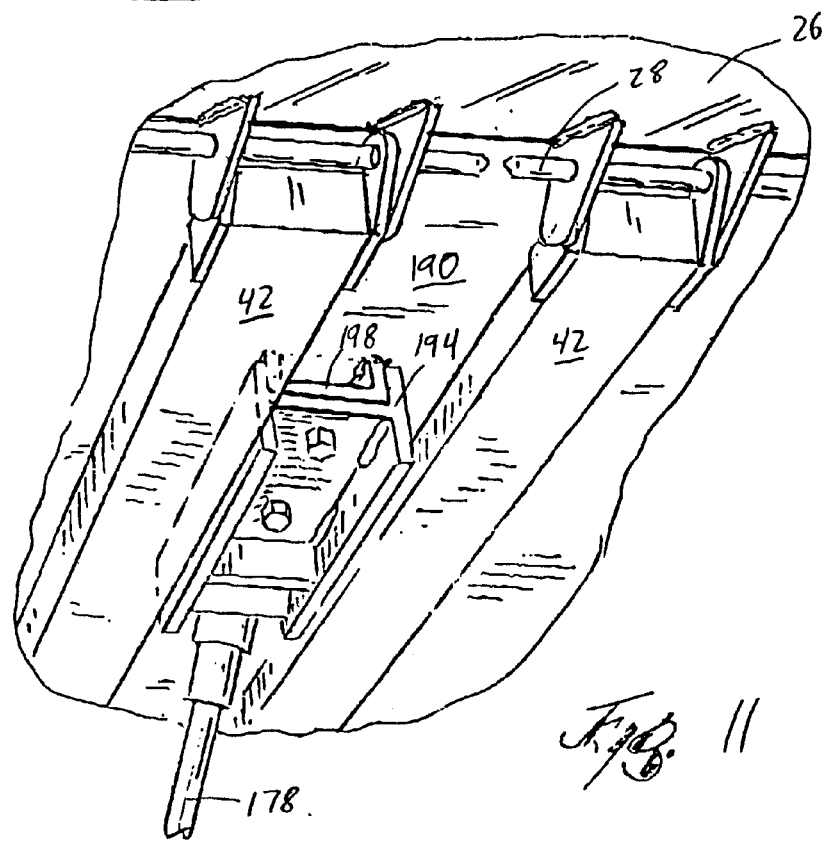
FIG. 11 is a partial perspective view of another embodiment of the dock leveler of FIG. 1 illustrating an alternative mounting arrangement of the hydraulic power unit with the present invention.

FIG. 11 illustrates another embodiment of the dock leveler 10 illustrated in FIG. 1. This embodiment is substantially identical to the embodiment illustrated in FIG. 9, with the exception of the attachment between the hydraulic piston 178 and the deck plate 190. In this embodiment, the hydraulic piston 178 is pivotably attached to a piston bracket 194, which is removably attached to a deck bracket 198. The illustrated deck bracket 198 is welded to the underside of the deck plate 190, and the piston bracket 194 is bolted to the deck bracket 198. Two threaded members or nuts (not shown) are welded to the back side of the deck bracket 198 facing the deck plate 190 to accommodate bolting the piston bracket 194 to the deck bracket 198. This embodiment allows a longer deck plate 190 to be used with the same hydraulic cylinder 152 illustrated in the embodiment of FIG. 9. To further accommodate a reduction in SKUs, the deck bracket 198 can be present in all embodiments of dock levelers of ten feet in length or greater whether they use a bag lifting subassembly or a hydraulic assembly. The piston bracket 194 is added with the hydraulic system when a hydraulic system is used in a dock leveler.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A dock leveler adapted to be mounted to a loading dock, the loading dock having an upper dock surface and having a pit disposed in the upper surface, the dock leveler comprising:

a supporting structure positionable within the pit;

a ramp having a rear edge movably interconnected with said supporting structure at a pivot point;

a pneumatic power unit mount configured to mount a pneumatic power unit, the pneumatic power unit mount being attached to the dock leveler at a location which permits the pneumatic power unit to move the ramp relative to the supporting structure when mounted; and a hydraulic power unit mount configured to mount a hydraulic power unit, the hydraulic power unit mount being attached to the dock leveler at a location which permits the hydraulic power unit to move the ramp relative to the supporting structure when mounted.

2. The dock leveler of claim 1, wherein the pneumatic power unit mount includes at least one bracket attached to the ramp.

3. The dock leveler of claim 2, wherein the at least one bracket is a hook-type bracket.

4. The dock leveler of claim 1, wherein the hydraulic mount includes holes formed in the supporting structure.

5. The dock leveler of claim 4, wherein the supporting structure includes at least two substantially vertical members, and wherein the holes are formed in the at least two substantially vertical members.

6. The dock leveler of claim 5, further including a support frame removably mounted to the at least two substantially vertical members using attachment devices in the holes.

7. The dock leveler of claim 1, further comprising a power unit coupled to one of the pneumatic power unit mount and the hydraulic power unit mount, and positioned to cause relative movement between the ramp and the pit floor upon operation of the power unit, thereby resulting in movement of the ramp relative to the supporting structure, wherein incorporation of the power unit prevents an additional power unit from being coupled to the other of the pneumatic power unit mount and the hydraulic power unit mount.

8. The dock leveler of claim 7, wherein the power unit includes a pneumatic power unit coupled to the pneumatic power unit mount.

9. The dock leveler of claim 7, wherein the power unit includes a hydraulic assembly having a hydraulic cylinder.

10. A dock leveler adapted to be mounted to a loading dock, the loading dock having an upper dock surface and having a pit disposed in the upper surface, the pit having a pit floor, the dock leveler comprising:

a supporting structure positionable within the pit;

a ramp having a rear edge movably interconnected with said supporting structure at a pivot point;

a pneumatic power unit mount configured to mount a pneumatic power unit, the pneumatic power unit mount being attached to the dock leveler at a location which permits the pneumatic power unit to move the ramp relative to the supporting structure when mounted; and a hydraulic power unit mount configured to mount a hydraulic power unit, the hydraulic power unit mount being attached to the dock leveler at a location which permits the hydraulic power unit to move the ramp relative to the supporting structure when mounted.

11. The dock leveler of claim 10, wherein the pneumatic power unit mount includes at least one bracket attached to the ramp.

12. The dock leveler of claim 10, wherein the at least one bracket is a hook-type bracket.

13. A method of producing a dock leveler adapted to be mounted to a loading dock, the loading dock having an upper dock surface and having a pit disposed in the upper surface, the pit having a pit floor, the method comprising:

forming a supporting structure positionable within the pit;

forming a ramp having a rear edge movably interconnected with said supporting structure at a pivot point;

forming a pneumatic power unit mount on the dock leveler, the pneumatic power unit mount configured to mount a pneumatic power unit, the pneumatic power unit mount being attached to the dock leveler at a location which permits the pneumatic power unit to move the ramp relative to the supporting structure when mounted; and forming a hydraulic power unit mount on the dock leveler, the hydraulic power unit mount configured to mount a hydraulic power unit, the hydraulic power unit mount being attached to the dock leveler at a location which permits the hydraulic power unit to move the ramp relative to the supporting structure when mounted.

14. The method of claim 13, wherein the act of forming a pneumatic power unit mount includes forming at least one bracket and attaching the bracket to the ramp.

15. The method of claim 14, wherein the act of forming at least one bracket includes forming a hook-type bracket.

16. The method of claim 13, wherein the act of forming the hydraulic mount includes forming holes in the supporting structure.

17. The method of claim 16, wherein the supporting structure includes at least two substantially vertical members, and wherein the holes are formed in the at least two vertical members.

18. The method of claim 17, further comprising forming a support frame and removably mounting the support frame to the at least two substantially vertical members using attachment devices in the holes.

19. The power unit of claim 10, wherein incorporation of the hydraulic power unit prevents a pneumatic power unit from being coupled to the pneumatic power unit mount.

20. The method of claim 13, further comprising:

mounting a power unit to one of the pneumatic power unit mount and the hydraulic power unit mount;

moving the ramp relative to the supporting structure with the power unit; and preventing the coupling of an additional power unit to the other of the pneumatic power unit mount and the hydraulic power unit mount with the location of the power unit.

* * * * *